(12) United States Patent
Fu et al.

(10) Patent No.: US 7,421,582 B2
(45) Date of Patent: Sep. 2, 2008

(54) METHOD AND APPARATUS FOR MUTUAL AUTHENTICATION AT HANDOFF IN A MOBILE WIRELESS COMMUNICATION NETWORK

(75) Inventors: Zhi Fu, Lake Zurich, IL (US); Gregory W. Cox, Schaumburg, IL (US); Aaron M. Smith, Fishers, IN (US)

(73) Assignee: Motorola, Inc., Schaumburg, IL (US)

( * ) Notice: Subject to any disclaimer, the term of this patent is extended or adjusted under 35 U.S.C. 154(b) by 727 days.

(21) Appl. No.: 10/857,462

(22) Filed: May 28, 2004

(65) Prior Publication Data
US 2005/0278532 A1 Dec. 15, 2005

(51) Int. Cl.
*H04L 9/00* (2006.01)
(52) U.S. Cl. .................. 713/169; 713/168; 713/150
(58) Field of Classification Search .......... 713/150, 713/168, 169; 455/410; 726/5
See application file for complete search history.

(56) References Cited

U.S. PATENT DOCUMENTS

2002/0197979 A1  12/2002  Vanderveen

OTHER PUBLICATIONS wikipedia, http://en.wikipedia.org/wiki/Extensible_Authentication_Protocol, year 2007.*
M. S. Bargh et al. ; Proceedings of the 2nd ACM international workshop on Wireless mobile applications and services on WLAN hotspots table of contents; Philadelphia, PA, USA; pp. 51-60 Year of Publication: 2004.*
Hsieh, et al., S-MIP: A Seamless Handoff Architecture for Mobile IP, IEEE INFOCOM 2003.
Pack, et al., Pre-Authenticated Fast Handoff in a Public Wireless LAN Based on IEEE 802.1x Model, School of Computer Science and Engineering, Seoul National University, Seoul, Korea.
Kempf, et al., Bidirectional Edge Tunnel Handover for IPv6, Internet Draft, Sep. 2001, pp. 1-22.
Aboba, Bernard, Microsoft, IEEE 802.1x Pre-Authentication, Jun. 17, 2002, pp. 1-50.
Calhoun, et al., Diameter Mobile IPv4 Application, AAA Working Group, Internet Draft, May 2004, pp. 1-45.
Aboba, Bernard, A Model forContext Transfer in IEEE 802, Network Working Group, Internet Draft, Apr. 2002, pp. 1-11.
Calhoun, et al., Diameter Base Protocol, Network Working Group, Sep. 2003, pp. 1-94.
Aboba, et al., PPP EAP TLS Authentication Protocol, Network Working Group, Oct. 1999, pp. 1-15.
Amendment 6: Medium Access Control (MAC) Security Enhancements, IEEE P802.11/D10.0, Apr. 2004, Institute of Electrical and Electronics Engineers, Inc., New York, NY, pp. 1-171.

(Continued)

*Primary Examiner*—David Jung
(74) *Attorney, Agent, or Firm*—Valerie M. Davis

(57) ABSTRACT

A method for mutual authentication in a mobile wireless communication network (100) that includes the steps of: verifying a second authenticating device (20) by a mobile node (30) based on a first authentication between the mobile node and a first authenticating device (10); and verifying the mobile node by the second authenticating device based on the first authentication, whereby the mobile node and the second authenticating device perform a second authentication.

18 Claims, 3 Drawing Sheets

OTHER PUBLICATIONS

EAP Methods for 802.11 Wireless LAN Security, International Engineering Consortium, On-Line Education.

Medium Access Control (MAC) and Physical (PHY) Specifications, ANSI/IEEE Std 802.11, 1999 Edition, pp. 59-69.

* cited by examiner

METHOD AND APPARATUS FOR MUTUAL AUTHENTICATION AT HANDOFF IN A MOBILE WIRELESS COMMUNICATION NETWORK

FIELD OF THE INVENTION

The present invention relates generally to communication networks and more specifically to mutual authentication in a wireless network at handoff between a mobile node and an authentication device.

BACKGROUND OF THE INVENTION

Fast handoff in communication networks is important for real-time applications such as, for instance, streaming video and other multimedia applications, audio, etc., so that the transmission of data is not interrupted. However, the authentication process can be a major factor contributing to communication disruption during handoff in a mobile wireless communication network such as, for instance, in a wireless local area network (WLAN) because authentication, generally, must be successfully completed prior to handoff. Authentication is the process of proving someone's or something's claimed identity and usually involves challenging a person or an entity to prove that he or it has physical possession of something or that he or it has knowledge of something. Authentication protocols define the message flows by which this challenge and response are sent and received by the parties being authenticated.

FIG. 1 illustrates a mobile wireless network 100, in this instance a WLAN network, having two authenticating entities or devices, which are in this illustration access points (AP) 10 and 20. APs 10 and 20 may provide access to an underlying network that may be implemented, for instance, as a wired network or as a mesh network having fixed access points. APs 10 and 20 may be, for instance, base stations. In this illustration, AP 10 provides access to a first subnet having a first coverage area, and AP 20 provides access to a second subnet having a second coverage area. The first and second coverage areas may or may not be overlapping.

FIG. 1 only shows two APs servicing two coverage areas for the purpose of ease of illustration. However, it should be understood by those of ordinary skill in the art that a WLAN network may be designed with any number of access points servicing a plurality of coverage areas. FIG. 1 also illustrates access points being the authenticating entities. However, those of ordinary skill in the art will realize that the type authenticating entity is dependant upon the layer (e.g., link, network, applications, etc.) at which authentication occurs.

As shown in FIG. 1, a mobile node 30 may roam from the first coverage area to the second coverage (as illustrated by the dashed arrow). Mobile node 30 may be, for instance, a laptop computer, a personal digital assistant, or any other suitable device. It is assumed for purposes of this example that while in the first coverage area mobile node 30 had access to the WLAN as a result of a successful authentication process with AP 10. During this authentication process, mobile node 30 was verified or identified as being authorized to have access to the WLAN resources. Moreover, if mutual authentication was performed (as it generally is in highly secure systems), AP 10 was also verified as a legitimate access point for providing access to the WLAN resources, to prevent rogue access points from gaining access to the WLAN resources. In addition, the authentication process would generally result in a shared secret being obtained or established between mobile node 30 and AP 10 for secure (e.g., encrypted) communications between the two.

In one embodiment, network 100 may be an 802.11 WLAN network, wherein mobile node 30 and APs 10 and 20 are configured to operate in accordance with the ANSI/IEEE (American National Standards Institute/Institute of Electrical and Electronics Engineers) 802.11 wireless LAN standards. Thus, APs 10 and 20 may be, for instance, 802.11 access points or base stations.

Today's 802.11 networks authenticate users according to the 802.1x standards. 802.1x specifies how to run the Extensible Authentication Protocol (EAP) directly over a link layer protocol. Among the EAP methods developed specifically for wireless networks are a family of methods based on the Transport Layer Security (TLS) protocol and public key certificates (also referred to in the art as certificate-based methods). These methods use the TLS public key certificate authentication mechanism within EAP to provide mutual authentication of client (e.g., mobile node 30) to server (e.g., AP 10) and server to client.

Typically the result of a successful authentication is the establishment of an AAA (authentication, authorization and accounting) state at the AP. The AAA state may include authorized service duration, authorization expiration time, quality of service (QoS) level, Security Association (SA), etc. The SA may include a shared secret such as a key, cryptographic algorithms, SA identity, etc., and is typically used for per-packet encryption and authentication. Without an SA between an AP and a MN, the secure connection cannot be resumed before the authentication process is completed. Without per-packet authentication, even if entity authentication is successful, attackers can still get in with spoofed or faked MAC addresses. Conversely, the AAA state enables packets to pass through only if they correctly apply the SA.

Although these certificate-based methods provide cryptographically strong authentication, there are some disadvantages to using these methods. For example, one key disadvantage is that these methods require complicated and expensive cryptographic algorithms or protocols that require a large number of sequential protocol exchanges (round trips) between the client and the server and resource intensive cryptographic computations to complete the authentication. Requiring a large number of protocol exchanges both lengthens the authentication delay for the user and uses more computing resources. This authentication delay is a particular problem for mobile users who must be re-authenticated when moving from one access point to another (e.g., when mobile node 30 moves from an old AP 10 to a new AP 20) and who require a seamless handoff so as not to disrupt ongoing communication sessions, for instance for public safety personnel. More specifically, certificate-based authentication can take seconds to complete, which can cause significant delay or interruption to voice, or other real-time traffic such as multimedia applications, for a mobile node that is constantly moving from one subnet to another.

There are a number of methods known in the art for addressing the effect on handoff due to authentication delay. Two such methods are inter-AP AAA context transfer and 802.1x pre-authentication. Inter-AP AAA context transfer involves transferring the AAA authorization state or shared secret information from one AP (the old AP) to another AP (the new AP) to avoid repeating the authentication process and to establish an AAA state at the new AP. 802.1x pre-authentication allows authentication to occur before association, as defined in the 802.11 wireless LAN standard, with the new AP and thus permits pre-authentication before handoff.

However, neither of the approaches completely solves the problem. More specifically, inter-AAA context transfer may fail in certain circumstances due to different capability or service support across APs, i.e., heterogeneous deployment (or incremental deployment that results in different capability support across APs). Pre-authentication can only be performed within a coverage area overlap between the old AP and the new AP. Thus, pre-authentication may not complete during the handoff if, for instance: there is no overlapping coverage area; the size of the overlapping coverage area is too small; or the mobile node moves too quickly through the overlapping coverage area.

Thus, there exists a need for a faster authentication process that may be used in both homogeneous and heterogeneous networks and that decreases the chance of a disruption in communication during handoff between access points. It is further desired that the authentication process be cryptographically strong, more cost efficient and use fewer computing resources.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
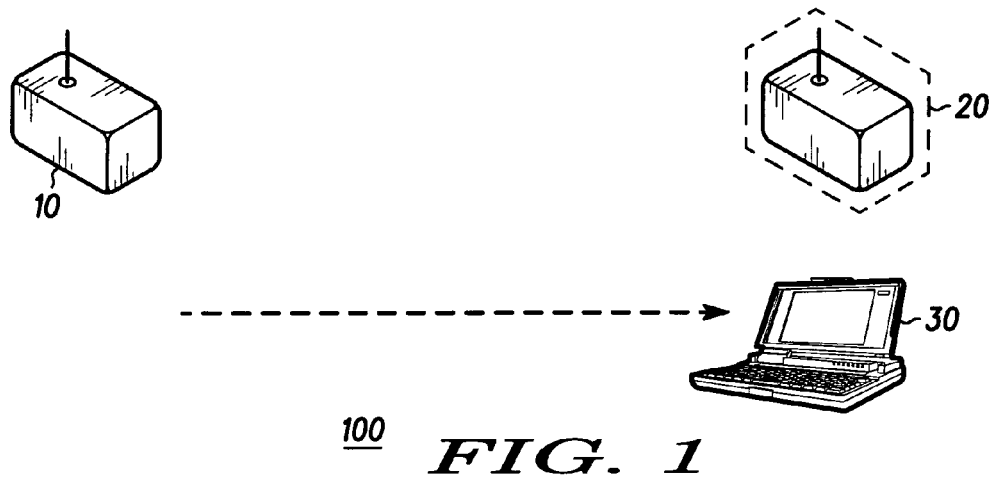
FIG. 1 illustrates a simple block diagram of a WLAN communication network.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

In one aspect, the present invention provides a method and apparatus for mutual authentication (i.e., establishing mutual trust) between a mobile node (e.g. MN 30) and an authenticating device (e.g., AP 20) when the mobile node moves from one authenticating device to another. In accordance with an embodiment of the present invention, the method of establishing a mutual trust relationship between the mobile node and the new authenticating device comprises two parts: a process for the mobile node to verify the new authenticating device, and a process for the new authenticating device to verify the mobile node.

Figure 2:
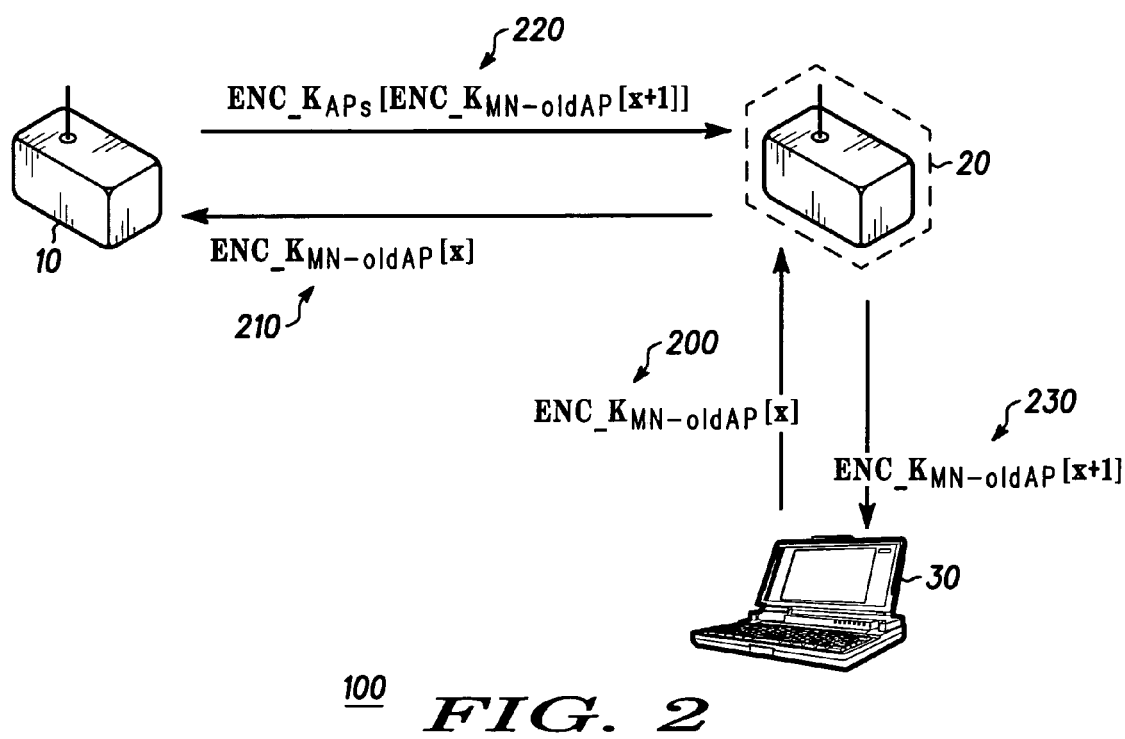
FIG. 2 illustrates a message sequence for a mobile node to verify an access point in accordance with an embodiment of the present invention.

FIG. 2 illustrates a message sequence for MN 30 to verify the new AP 20 based upon the authentication or established mutual trust between MN 30 and the old AP 10. The underlying assumption supporting this authentication process is that MN 30 trusts the new AP 20 if MN 30 trusts the old AP 10, and the old AP 10 trusts the new AP 20. In this illustration, MN 30 verifies AP 20 based upon a shared secret, in this case a shared secret key $K_{MN\text{-}oldAP}$, which was established between MN 30 and AP 10 during the authentication process between those two entities, when MN 30 was in the coverage area serviced by AP 10.

Accordingly, FIG. 2 illustrates a message sequence having four messages (200, 210, 220 and 230) that may be exchanged between MN 30, the old AP 10 and the new AP 20 to enable MN 30 to verify or authenticate AP 20. To generate message 200, MN 30 generates a random number x as a challenge to the old AP 10 and encrypts the x with $K_{MN\text{-}oldAP}$, thereby generating $ENC\_K_{MN\text{-}oldAP}[x]$ (where $ENC\_K[x]$ denotes encryption of x using a secret key K). Generally x would be encrypted using the cryptographic algorithm negotiated between MN 30 and AP 10 during their mutual authentication process.

MN 30 sends $ENC\_K_{MN\text{-}oldAP}[x]$ (200) to the new AP 20 who forwards $ENC\_K_{MN\text{-}oldAP}[x]$ (210) to the old AP 10. Upon receipt of the message, the new AP 20 typically cannot decode x as it should not have access to $K_{MN\text{-}oldAP}$, which is why AP 20 simply forwards the message to AP 10. Upon receipt of $ENC\_K_{MN\text{-}oldAP}[x]$, AP 10 will use the shared secret key $K_{MN\text{-}oldAP}$ to decrypt $ENC\_K_{MN\text{-}oldAP}[x]$ and to recover x. Upon recovery of x, the old AP 10 will generate a second value to encrypt that is generally predetermined and is ideally a function of x. In this case, AP 10 increments x by one (i.e., generates x+1) and encrypts x+1 with $K_{MN\text{-}oldAP}$ to generate $ENC\_K_{MN\text{-}oldAP}[x+1]$, as a challenge to MN 30. Those of ordinary skill in the art will realize that the second value may be any suitable function of x.

AP 10 may then further encrypt $ENC\_K_{MN\text{-}oldAP}[x+1]$ with a shared secret, e.g., a secret key $K_{APs}$, between AP 10 and AP 20 to generate $ENC\_K_{APs}[ENC\_K_{MN\text{-}oldAP}[x+1]]$ (220), as a challenge to AP 20. $K_{APs}$ and a corresponding encryption algorithm may be obtained using any conventional method such as, for instance, having all legitimate APs in network 100 being pre-configured with $K_{APs}$ or $K_{APs}$ being distributed by a central controller. AP 10 then forwards message 220 to AP 20. If AP 20 is a legitimate AP, as briefly discussed above, it will have access to $K_{APs}$ to decrypt message 220 to recover $[ENC\_K_{MN\text{-}oldAP}[x+1]$. AP 20 could then forward $[ENC\_K_{MN\text{-}oldAP}[x+1]$ (230) to MN 30. If MN 30 decrypts message 230 to find the predetermined value x+1, then it has successfully verified the new AP 20 through the trust relationship with the old AP 10. MN 30 can then start to send traffic to the new AP 20. With this approach, MN 30 verifies the new AP 20 to be legitimate after MN 30 has verified the old AP 10 and the old AP 10 has verified the new AP 20.

As illustrated by reference to FIG. 2, the old AP 10 verifies the new AP 20 using a shared secret between the APs. This verification to determine legitimate or authorized APs may be used in a distributed approach for the WLAN network 100. However, those of ordinary skill in the art will realize that in another embodiment, e.g., a centralized approach, each authorized AP may be registered, for instance, with a centralized server (for instance using their link layer address, also known in the art as a MAC (media access control) layer address). Accordingly, AP 10 may have access to a list of other APs registered with the sever, and if AP 20 is on the list then AP 10 can verify AP 20, in this manner, as being an authorized AP. In this embodiment, no secret key between the APs need be used to verify AP 20, thereby, rendering message 220 unnecessary. Upon verification of AP 20, AP 10 will simply forward message 230 to MN 30 via AP 20.

Figure 3:
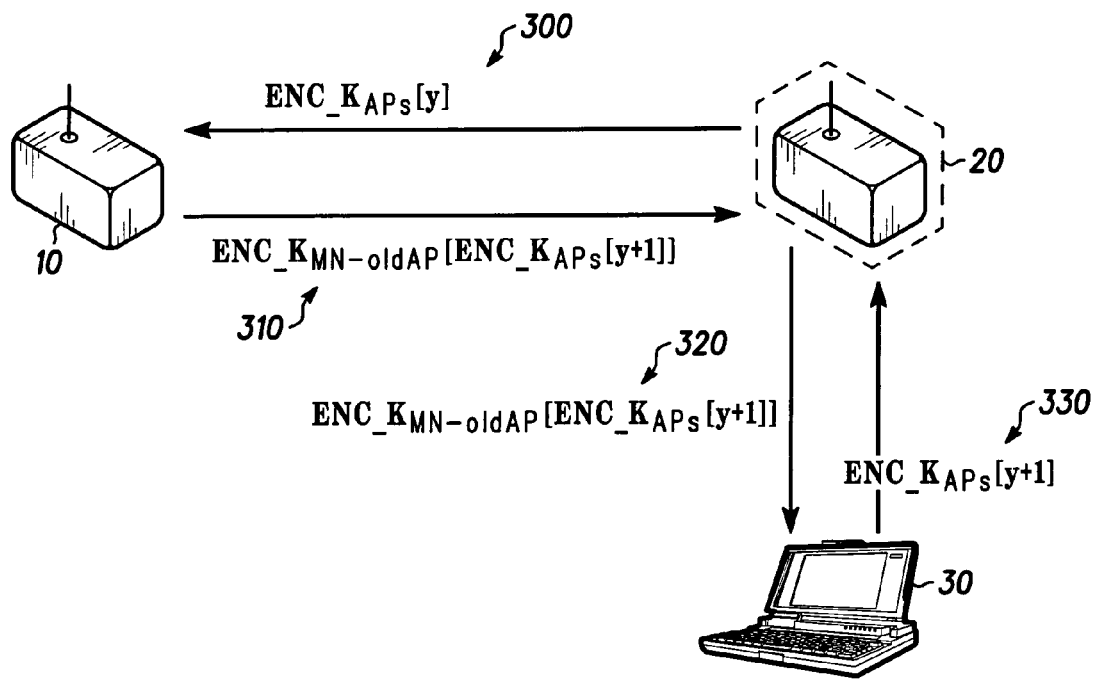
FIG. 3 illustrates a message sequence for an access point to verify a mobile node in accordance with an embodiment of the present invention.

The process for the new AP 20 to verify MN 30 is illustrated in FIG. 3. Similar to the process explained in FIG. 2, the new AP 20 can verify the legitimacy of MN 30, with four message exchanges 300, 310, 320 and 330, based upon the authentication or established mutual trust between MN 30 and the old AP 10. The underlying assumption supporting this authentication process is that the new AP 20 trusts MN 30 if the new AP 20 trusts the old AP 10, and the old AP 10 trusts MN 30. In this illustration, as in the illustration shown by reference to FIG. 2, AP 20 verifies MN 30 based upon key $K_{MN\text{-}oldAP}$.

To generate message 300, AP 20 generates a random number y as a challenge to the old AP 10 and encrypts the y with $K_{APs}$, thereby generating $ENC_{13}\ K_{APs}[y]$. AP 20 sends $ENC\_K_{APs}[y]$ (300) to AP 10. Upon receipt of the message, if AP 10 is an authorized access point, it will use the shared secret key $K_{APs}$ to decrypt $ENC\_K_{APs}[y]$ to recover y. Upon recovery of y, the AP 10 will generate a second value to encrypt that is generally predetermined and is ideally a function of y. In this case, AP 10 increments y by one (i.e., generates y+1) and encrypts y+1 with $K_{APs}$ to generate $ENC\_K_{APs}[y+1]$, as a challenge to AP 20. Those of ordinary skill in the art will realize that the second value may be any suitable function of y. AP 10 then further encrypts $ENC\_K_{APs}[y+1]$ with $K_{MN\text{-}oldAP}$ to generate $ENC\_K_{MN\text{-}oldAP}[ENC\_K_{APs}[y+1]]$ (310), as a challenge to MN 30.

AP 10 then forwards message 310 to AP 20 who in turn forwards it to MN 30 (320) since AP 20 should not have the appropriate key $K_{MN\text{-}oldAP}$ to decrypt message 310. Upon receipt of $ENC\_K_{MN\text{-}oldAP}[ENC\_K_{APs}[y+1]]$, MN 30 decrypts it to recover $ENC\_K_{APs}[y+1]$, and since MN 30 should not have the appropriate key $K_{APs}$ to decrypt this message, MN 30 forwards $ENC\_K_{APs}[y+1]$ (330) to AP 20. If AP 20 decrypts message 330 to find the predetermined value y+1, then it has successfully verified MN 30 through its trust relationship with the old AP 10. With this approach, AP 20 verifies MN 30 to be legitimate after the old AP 10 has verified MN 30, and AP 20 has verified AP 10. Moreover, as with regard to the process illustrated in FIG. 2, those of ordinary skill in the art will realize that AP 20 may, alternatively, verify AP 10 using the centralized approach discussed above. In such an embodiment, no shared secret between AP 10 and AP 20 need be used in the message sequence.

Combining the four messages illustrated FIG. 2 with the four messages illustrated in the FIG. 3, the new AP 20 and MN 30 can establish a mutual trust relationship. Moreover, the two verifications can be run consecutively or, can be, ideally, run concurrently. This inventive method of mutual authentication may continue to be used if the mobile node moves to yet another access point or back to the first access point and may be used until, for instance, the mobile node shuts down or moves to a new access point that does not have a trust relationship with the old access point.

Mutual authentication in accordance with the present invention thereby enables a process that is much less resource expensive than, for instance, a complete certificate-based authentication process since much fewer round trips between the entities are used than is required with certificate-based authentication. More specifically, the embodiment of the present invention illustrated in FIGS. 2 and 3 only require two four-message verifications run in parallel with fast symmetric encryption-decryption computation for mutual authentication between a mobile node and an access point. This results in a much smaller handoff delay associated with authentication.

Figure 4:
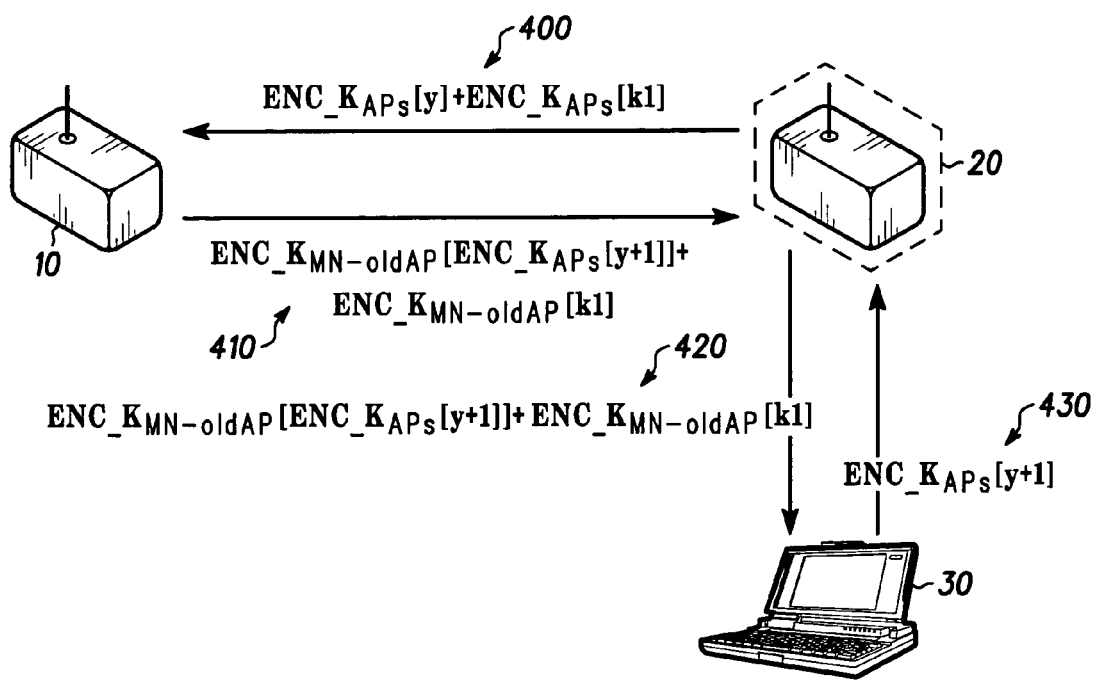
FIG. 4 illustrates a message sequence for establishing a shared secret between a mobile node and an access point during mutual authentication in accordance with an embodiment of the present invention.

In addition to mutual trust has being established between MN 30 and AP 20 in accordance with the present invention, a shared secret must be established between MN 30 and AP 20 in order to authenticate traffic between the two entities. In one embodiment, shared secret establishment may be "piggybacked" or appended to the mutual verification messages. FIG. 4 is illustrative of a message sequence that may be implemented for establishing a shared secret between MN 30 and AP 20 concurrently with mutual authentication, in accordance with the present invention. Those of ordinary skill in the art will realize that FIG. 4 illustrates only one example of a message sequence that may be implemented for establishing a shared secret between MN 30 and AP 20 and that alternative message sequences may be implemented for this purpose.

Returning to FIG. 4, the new AP 20 may generate a random number k1 that would serve as a shared secret, in this instance a key, between MN 30 and AP 20 and encrypt it with the shared key $K_{APs}$ between AP 10 and 20. AP 20 could then forward this encrypted key to AP 10 with message 300 (of FIG. 3) to generate message 400. When AP 10 receives message 400, it decrypts the message to recover message 300 and k1. Thereafter, when AP 10 generates message 310 it adds to this message k1 encrypted with $K_{MN\text{-}oldAP}$, to generate message 410. AP 10 forwards message 410 to AP 10 who further forwards it to MN 30 (i.e., message 420). When MN 30 decrypts message 420 to recover message 320, it can also recover the shared secret k1. Mutual authentication and establishment of the shared key k1 can then be completed with AP 20 receiving message 330 and decrypting this message to recover the predetermined value y+1.

Once the shared secret between MN 30 and AP 20 is established, handoff to AP 20 can occur to enable AP 20 to encrypt and decrypt traffic to and from MN 30, thus establishing direct secure communication between AP 20 and MN 30. In this way, AP 20 can, for instance, reach a AAA state using the present invention. In a similar manner, algorithm negotiation between MN 30 and AP 20 can be piggybacked with the mutual authentication messages. However, algorithm negotiation in another embodiment can be sent directly between MN 30 and AP 20 without encryption.

Figure 5:
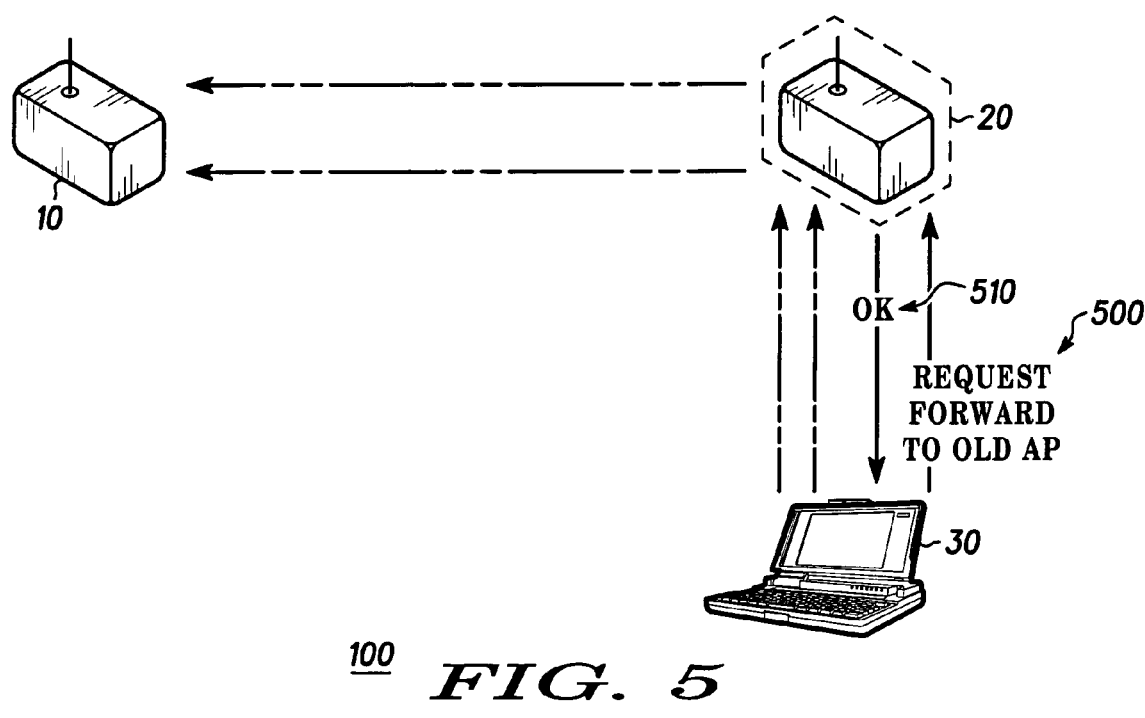
FIG. 5 illustrates how traffic is forwarded to and from a mobile node prior to mutual authentication with a new access point in accordance with an embodiment of the present invention.

To implement an embodiment of the present invention having virtually no handoff delay, MN 30 may request the new AP 20 to forward or tunnel traffic through the old AP 10 prior to the completion of mutual authentication. FIG. 5 illustrates this embodiment. Accordingly, using a message 500, MN 30 sends a request to the new AP 20 to forward traffic to the old AP 10 for legitimacy check using the mutual trust relationship established between MN 30 and AP 10. Upon AP 20 responding with an acknowledgement type message 510, e.g., an O.K., MN 30 can begin forwarding traffic to AP 10 via AP 20 (as illustrated by the dashed arrows), wherein the traffic is encrypted using the secret shared between the old AP 10 and MN 30. Upon receipt of the traffic, the old AP 10 will verify the traffic before allowing it through. Likewise, AP 10 can also verify traffic destined to MN 30 before allowing it through to MN 30. The messages 500 and 510 can, generally, be piggybacked or appended to IEEE 802.11 association messages, wherein they would thereby incur essentially zero delay during handoff.

For a more robust security implementation, the new AP 20 should make sure that the old AP 10 specified in the request is not a rogue AP. In one embodiment, the new AP 20 can encrypt the traffic with the shared secret $K_{APs}$ before forwarding, thereby thwarting an attempt to forward traffic using a rogue AP. In another embodiment, AP 20 can verify AP 10 using the centralized approach discussed above. Moreover, in yet another embodiment, the method illustrated in FIG. 5 can be combined with the use of a timer. In this embodiment, MN 30 will start to send traffic. At the same time, MN 30 can start mutual verification and key establishment message sequences with a timer set to a predetermined amount of time. If mutual verification does not successfully complete prior to the expiration of the timer, MN 30 will stop sending traffic to the new AP 20. The timer may be set with a small value because a successful mutual verification should be accomplished using the present invention in a much shorter amount of time than with, for instance, conventional certificate-based authentication methods, for example to enable a decrease in the authentication delay from the order of seconds to the order of milliseconds.

In one embodiment the messages described by reference to FIGS. 2-4 may be sent at the link (or MAC) layer. However, the present invention may also be implemented at other layers. For example, in another embodiment, the messages described by reference to FIGS. 2-4 may be sent at the network layer, also known in the art as the internet protocol (IP) layer. At the network layer, the authenticating entity may be, for instance, a router. In yet another embodiment, the messages described by reference to FIGS. 2-4 may be sent at the application layer. At the application layer, the authenticating entity may be, for instance, an application server. The message sequence and the forwarding of traffic in accordance with FIG. 5 may, likewise, be accomplished at the link layer or the network layer. Moreover, the changes to the mobile nodes and the authenticating entities in order to implement the present invention may be made, for instance, in software that may be stored in a memory device and run on a processing device in the mobile node or the authenticating entity. Alternatively, these changes to the mobile node and the authenticating entity may be made in hardware.

Following is a recitation of some advantages of the present invention, which is meant to be illustrative of such advantages and not necessarily an exhaustive listing thereof. One advantage of the present invention is that it may be used in a homogeneous deployment that results in the same capability support across APs as well as in a heterogeneous deployment, since the shared secret between the MN and the old AP is not simply forwarded to the new AP.

Another advantage of the present invention is that its implementation is independent of the presence or size of overlapping coverage area between the old AP and the new AP and is further independent of the speed with which the MN might traverse between the respective coverage areas.

Yet another advantage of the present invention is that fewer computations are used to establish mutual authentication and a shared secret resulting in a faster handoff delay in order to lessen the instances of communication disruption during handoff or, ideally, to altogether prevent communication disruption.

Still another advantage of the present invention is the option of immediate forwarding of traffic prior to the completion of handoff for virtually zero handoff delay.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for mutual authentication in a mobile wireless communication network comprising the steps of:
    verifying a second access point by a mobile node based on a first mutual authentication between said mobile node and a first access point; and
    verifying said mobile node by said second access point based on said first mutual authentication, whereby said mobile node and said second access point perform a second mutual authentication.

2. The method of claim 1, wherein said mobile node and said second access point are verified based on a first shared secret obtained during said first mutual authentication.

3. The method of claim 2, wherein said step of verifying said second access point comprises the steps of:
    generating a first random value;
    encrypting said random value using said first shared secret;
    forwarding said encrypted value to said first access point via said second access point;
    receiving an encrypted second value from said first access point via said second access point; and
    decrypting said second value, wherein said second access point is verified if said second value is equal to a first predetermined value.

4. The method of claim 3, wherein said first predetermined value is a function of said first random value.

5. The method of claim 3, wherein said second value is encrypted and decrypted using said first shared secret.

6. The method of claim 2, wherein said step of verifying said mobile node comprises the steps of:
    generating a first random value;
    encrypting said first random value using a second shared secret between said first access point and said second access point;
    forwarding said encrypted first random value to said first access point;
    receiving a second value from said first access point that is encrypted using said second shared secret;
    forwarding said encrypted second value to said mobile node;
    receiving a decrypted second value from said mobile node; and
    further decrypting said second value, wherein said mobile node is verified if said second value is equal to a first predetermined value.

7. The method of claim 6, wherein said first predetermined value is a function of said first random value.

8. The method of claim 6, wherein said second value is encrypted by said first access point and decrypted by said mobile node using said first shared secret.

9. The method of claim 1 further comprising the step of requesting said second access point to tunnel traffic to and from said mobile node using said first access point.

10. The method of claim 9, wherein said step of requesting is performed before the second mutual authentication is complete.

11. The method of claim 9, wherein said traffic is tunneled until the occurrence of at least one of the expiration of a timer and the completion of said second mutual authentication.

12. The method of claim 1, wherein said steps of verifying said mobile node and said second access point are further based on a mutual trust between said first and second access points.

13. The method of claim 12, wherein the mutual trust between said first and second access points is based on a shared secret between said first and second access points.

14. The method of claim 1, wherein said method is performed at least one of a link layer, a network layer and an applications layer of the communication network.

15. The method of claim 1, further comprising establishing a shared secret between said mobile node and said second access point based on said first mutual authentication and based on a mutual trust between said first and second access points.

16. A method for authentication in a mobile wireless communication network comprising the steps of:
sending a first message to a first access point via a second access point, said first message based on a first mutual authentication between a mobile node and said first access point; and
receiving a second message from said first access point via said second access point, said second message being based on said first mutual authentication, wherein said second message is used to verify said second access point by the mobile node.

17. A method for authentication in a mobile wireless communication network comprising the steps of:
sending a first message to a first access point;
receiving a second message from said first access point, said second message being based on a first mutual authentication between said first access point and a mobile node;
forwarding said second message to said mobile node; and
receiving a third message from said mobile node, wherein said third message is used to verify said mobile node by second access point.

18. Apparatus for mutual authentication in a mobile wireless communication network comprising:
means for verifying a second access point by a mobile node based on a first mutual authentication between said mobile node and a first access point; and
means for verifying said mobile node by said second access point based on said first mutual authentication, whereby said mobile node and said second access point perform a second mutual authentication.

* * * * *